United States Patent [19]

Park et al.

[11] Patent Number: 5,574,221
[45] Date of Patent: Nov. 12, 1996

[54] ANGULAR ACCELERATION SENSOR

[75] Inventors: Kyoo Y. Park; Suk M. Choi, both of Seoul, Rep. of Korea

[73] Assignee: Samsung Electro-Mechanics Co., Ltd., Kyongki-do, Rep. of Korea

[21] Appl. No.: 330,462

[22] Filed: Oct. 28, 1994

[30] Foreign Application Priority Data

| Oct. 29, 1993 | [KR] | Rep. of Korea | 22432 |
| Oct. 29, 1993 | [KR] | Rep. of Korea | 22433 |
| Oct. 29, 1993 | [KR] | Rep. of Korea | 22763 |
| Oct. 29, 1993 | [KR] | Rep. of Korea | 22764 |

[51] Int. Cl.⁶ .................................................. G01P 15/08
[52] U.S. Cl. ................................ 73/514.02; 73/514.36
[58] Field of Search .......................... 73/504, 505, 510, 73/517 A, 651, 514.02, 504.04, 504.11, 504.15, 514.33, 514.34, 514.36

[56] References Cited

U.S. PATENT DOCUMENTS

| 4,431,935 | 2/1984 | Rider | 73/504 |
| 4,457,173 | 7/1984 | Hunter | 73/510 |
| 4,601,205 | 7/1986 | Pittman | 73/510 |
| 4,700,973 | 10/1987 | Gademann et al. | 73/516 R |
| 4,996,878 | 3/1991 | Kubler | 73/517 A |
| 5,001,940 | 3/1991 | Ogawa | 73/505 |
| 5,212,986 | 5/1993 | Takeuchi | 73/517 R |

FOREIGN PATENT DOCUMENTS

| 3-172713 | 7/1991 | Japan . | |
| 4-20865 | 1/1992 | Japan | 73/517 A |
| 4-106406 | 4/1992 | Japan . | |
| 4-106409 | 4/1992 | Japan . | |
| 4-106408 | 4/1992 | Japan . | |

*Primary Examiner*—John E. Chapman
*Attorney, Agent, or Firm*—Lowe, Price, LeBlanc & Becker

[57] ABSTRACT

Seismic inertias are attached to the ends of the arms of elastic plate. Piezoelectric elements are adhered to the upper surfaces of the arms and the elastic plate is supported in the center by a support. When rotation force is applied to the arms of the elastic plate, the arms bend towards opposite direction. The piezoelectric elements are suppressed or extended by the elastic force, thereby they generate electric signals. Rotation directions and angular acceleration velocity can be detected by processing those signals.

4 Claims, 6 Drawing Sheets

ANGULAR ACCELERATION SENSOR

FIELD OF THE INVENTION

This invention relates to an angular acceleration sensor, and more particularly to an improved angular acceleration sensor for generating electrical signals in response to the angular acceleration by using a piezoelectric element.

BACKGROUND OF THE INVENTION

Conventional angular acceleration sensors may be found in Japanese Patent Laid Open Number 4-106409. FIGS. 7 and 8 show the conventional angular acceleration sensor. The conventional angular acceleration sensor has the structure as follow:

In FIG. 7, the sensor comprises four supporting posts 2, 3, 4, 5 arrayed on a base plate 1 and two fine metal lines 11, 12 connected between support posts 2, 5 and support posts 3, 4. Two support points 9, 10 formed on a metal bar 6 of a triangle are welded to the two fine metal lines 11, 12 so that the metal bar 6 is suspended at the metal lines 11, 12. The section of the metal bar 6 has a regular triangle shape. As shown in FIG. 8, a piezoelectric element 13 is adhered to the bottom of the metal bar 6 so that the piezoelectric element 13 is vibrated to Z-axis direction in response to the electrical signal applied from a voltage source Vo.

The vibration of the piezoelectric element 13 is transferred to the metal bar 6, and then it is converted into the vibrations of the A-axis and B-axis directions. When the left and right rotation forces are applied to the metal bar 6 about the center of the X-axis shown in FIG. 7, Coriolis force is generated by the rotation forces and the differences are generated between the vibration strength in the A-axis direction and the vibration strength in the B-axis direction.

The differences are converted into electrical signals through the piezoelectric elements 7, 8. The electrical signals are inputted to an amplifier A1 through resistors R1, R2. The angular acceleration is measured with the output of the amplifier A1.

In the conventional angular acceleration sensor, since it has three-dimensional structure as shown, there are difficulties in achieving a successful operation efficiency of manufacturing and a mass production. Also, since the metal bar 6 should be welded to the fine metal lines 11, 12, it requires precision work of the highest order. The angular acceleration of two-axes direction is measured by using two sensors. If two sensors are not accurately perpendicular to each other, a disturbance is occurred by each other. Also, since the Coriolis force is used in the sensor, it requires driving means, and since a power source for the driving means is needed, there has been a great difficulty in achieving a simple apparatus.

The present invention is contrived to overcome the aforementioned various problems.

It is an object of the invention to provide an angular acceleration sensor which can measure the angular acceleration by a piezoelectric element and an elastic body.

It is other object of the invention to provide an angular acceleration sensor which can measure the angular acceleration by minimizing the output to the vibration of two-axes directions.

It is another object of the invention to provide an angular acceleration sensor which can measure the angular acceleration of 2-axes directions with one sensor.

It is a further object of the invention to provide an angular acceleration sensor which can measure the angular acceleration of 2-axes directions, wherein mutual disturbance by the rotation forces in 2-axes directions can be minimized.

It is another object of the invention to provide an angular accleration sensor capable of reducing the size of the sensor.

It is an additional object of the invention to provide an angular acceleration sensor without using a Coriolis force.

In order to achieve the foregoing objects, the angular acceleration sensor of this invention comprises an elastic plate each arm of which bends towards two opposite directions by the rotation forces, a pair of piezoelectric elements adhered onto the elastic plate and each element symmetrically positioned at same distance from the center of the plate, a pair of inertia bodies symmetrically positioned at each end of the piezoelectric elements, and a support member for supporting the center of the elastic plate.

DETAILED DESCRIPTION OF THE INVENTION

Hereinafter, a preferred embodiment of the present invention will be described in detail with reference to the accompanying drawings.

Figure 1:
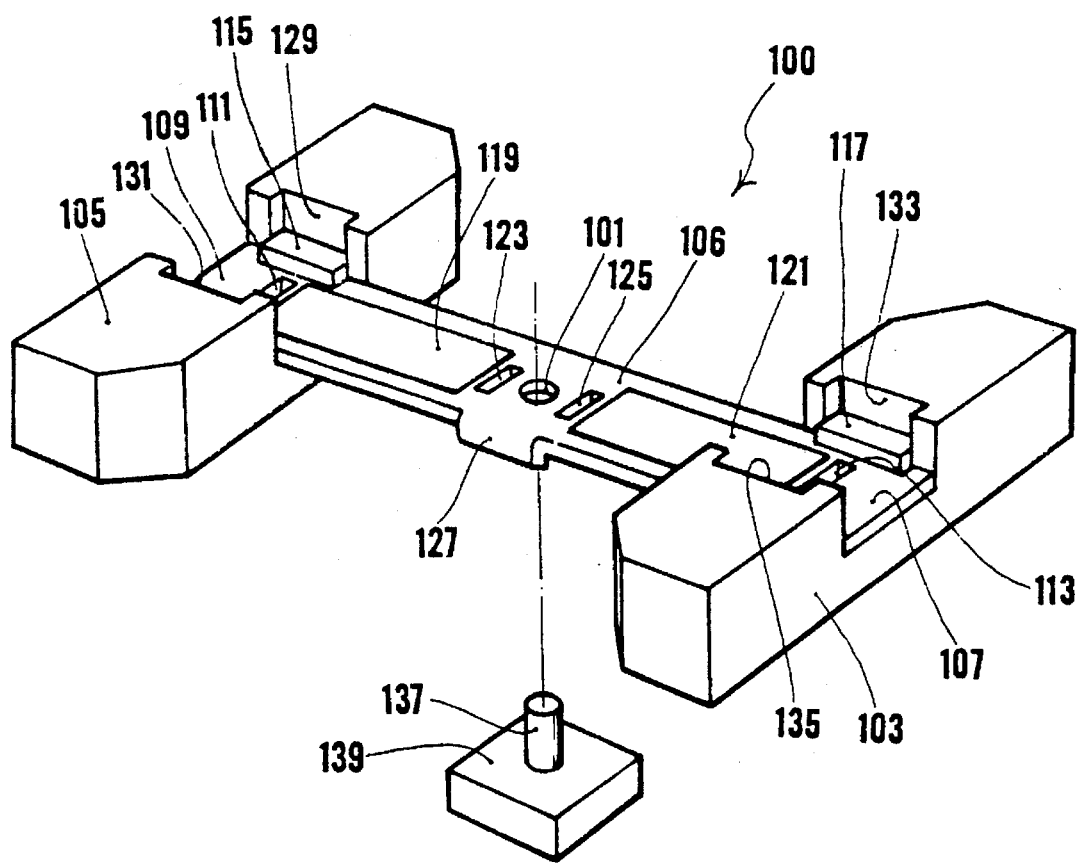
FIG. 1 is a perspective view of a one-directional angular acceleration sensor according to a preferred embodiment of this invention.

FIG. 1 shows a preferred embodiment of the angular acceleration sensor having a single direction characteristic according to the present invention. The sensor 100 comprises an elastic plate 106 made of metal or other electrically conductive materials, piezoelectric elements 119, 121 welded to the upper side of the elastic plate 106, seismic inertia bodies 103, 105 for applying inertia forces to the elastic plate 106 and a support member 139 for supporting the elastic plate 106.

A pin hole 101 is made in the center of the elastic plate 106 and a support pin (137) formed in the center of the support member 139 is inserted into the pin hole. Position indication grooves 111, 113, 123, 125 for indicating the adhesive position of the piezoelectric elements 119, 121 are formed on the surface of the elastic plate 106. The position indication grooves 111, 113 and 123, 125 are located the same distance from the pin hole 101, respectively, so that the same rotation forces in response to the rotation vibration are applied to the piezoelectric elements 119, 121. A pair of guide protrusions 127, are formed on both sides of the center of the elastic plate to prevent the position of the plate from warping to the left or right side when the elastic plate 106 is positioned on the support member 139.

The inertia bodies 103, 105 having equal weight and shape face each other and they consist of heavy metal alloy so as to have inertia forces in response to the rotation forces. In the preferred embodiment, copper alloy may be used. In order to reduce disturbance caused by the axial vibration of the elastic plate, the horizontal line crossing the centroids of the inertia bodies 103, 105 coincide with the upper side of the elastic plate 106.

In order to achieve such positionings, as shown in FIG. 1, the center portions of the seismic inertias 103, 105 are cut in width to receive the elastic plate 106 and in a predetermined height so that the centroid of the cut seismic inertia 103, 105 be positioned on the upper surface of the elastic plate 106.

The arms 107, 109 of the elastic plate 106 are positioned onto the cut portions (openings) of the seismic inertias 103, 105 and fixed by compressing the arms with cut segments of lateral faces 129, 131, 133, 135.

The arm-compressing cut segments can be formed by cutting the lateral faces 129,131, 133, 135 even though only two cut segments 115 and 117 are shown in FIG. 1.

The operation of the angular acceleration sensor according to the present invention will be described hereinafter.

Figure 3A:
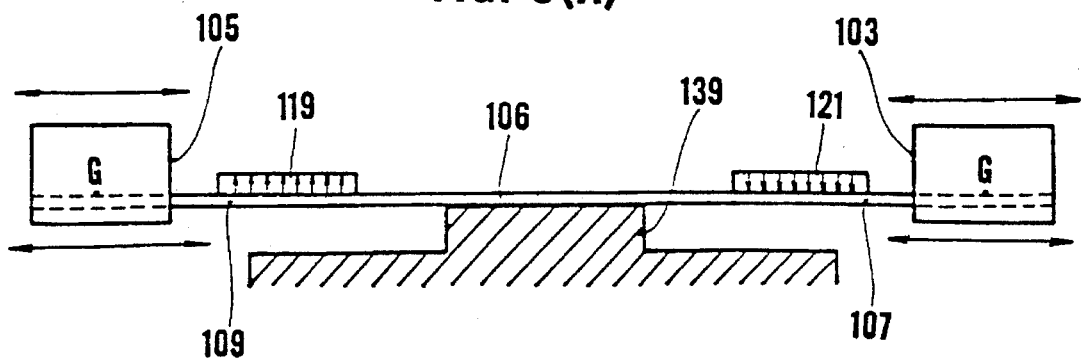
FIGS. 3(A), (B) and (C) are schematic diagrams showing the operation of the one-directional angular acceleration sensor according to one embodiment of the present invention.

FIGS. 3(A), (B) and (C) are illustrative schematic diagrams showing the operation of the angular acceleration sensor according to the present invention.

Figure 3B:
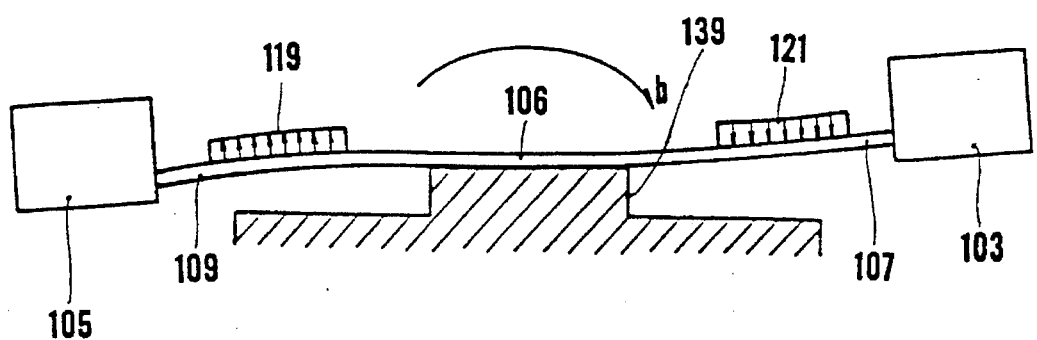

As shown in FIG. 1, the centroids G of the seismic inertias 103, 105 are positioned on the upper surface of the elastic plate 106 (shown as dotted line). Thus, when translational forces in arrow direction are applied to the sensor of the present invention, because the seismic inertias 103, 105 do not vibrate up and down, the sensor is not influenced by the translational forces. When rotational forces indicated in arrow direction(b) shown in FIG. 3(B) is applied to the sensor of the present invention, because the seismic inertias 103, 105 tend to stay at the original position due to its own weight, the left arm 109 of the elastic plate 106 bends downward.

When the radially central portion of left arm 109 bulges upward, a pulling tension from the both lateral faces is applied to the piezoelectric element 119 attached to the upper side of the arm 109 by conductive adhesives ("soldering" in the embodiment). Because the piezoelectric element 119 received the pulling tension generates the voltage opposite to the polarizing direction (the arrow direction marked in the piezoelectric element 119 as shown in FIG. 3), the top of the piezoelectric element 119 is polarized with negative voltage(−) and the bottom with positive voltage(+).

The right arm 107 of the elastic plate 106 bends downward by a falling rotation force. When it bulges downward, the piezoelectric element 121 receives compressing force from both lateral faces. Accordingly, because the piezoelectric element 121 generates the voltage in the polarizing direction, its top is polarized with a negative voltage(−) and its bottom with a positive voltage(+). Thus the voltages vary with the direction of rotation and the direction and the magnitude of the angular acceleration can be detected by applying the voltage to the signal processing means through the wire electrically connecting to the piezoelectric element.

Figure 3C:
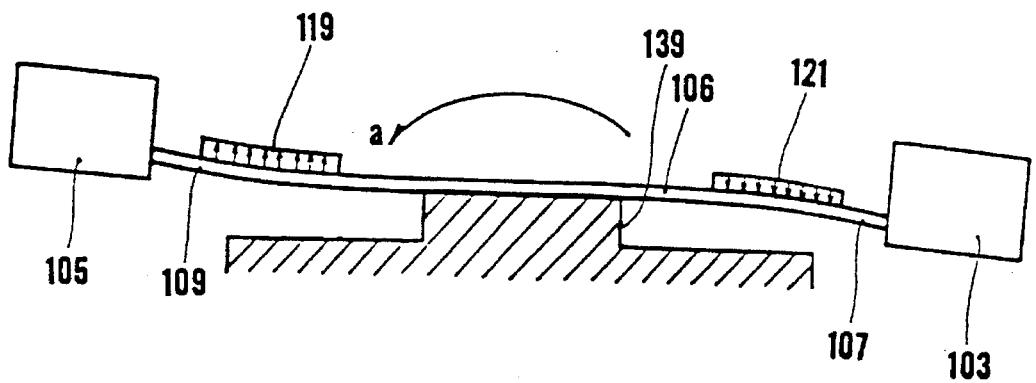

When the rotation force is applied in the arrow direction as shown in FIG. 3(C), in the same manner, the left arm 109 of the elastic plate 106 receives a rotation force and bends upward. The right arm 107 of the elastic plate 106 receives a rotation force and bends downward. At this time, the piezoelectric element 119 receives compressing forces from both lateral faces. Because the piezoelectric element 119 receiving the compressing force generates voltages equal to the polarizing direction, the top is polarized with positive voltage(+) and the bottom with negative voltage(−). And because the piezoelectric element 121 received a pulling tension generates the voltage opposite to the polarizing direction, its top is polarized with positive voltage(+) and its bottom with negative voltage(−). As described above, because the generated voltage at the piezoelectric element varies with the direction of rotation, the direction and the strength of the angular acceleration can be detected by applying the voltage to the signal processing means through the wire electrically connecting to the piezoelectric element 119, 121.

Figure 2:
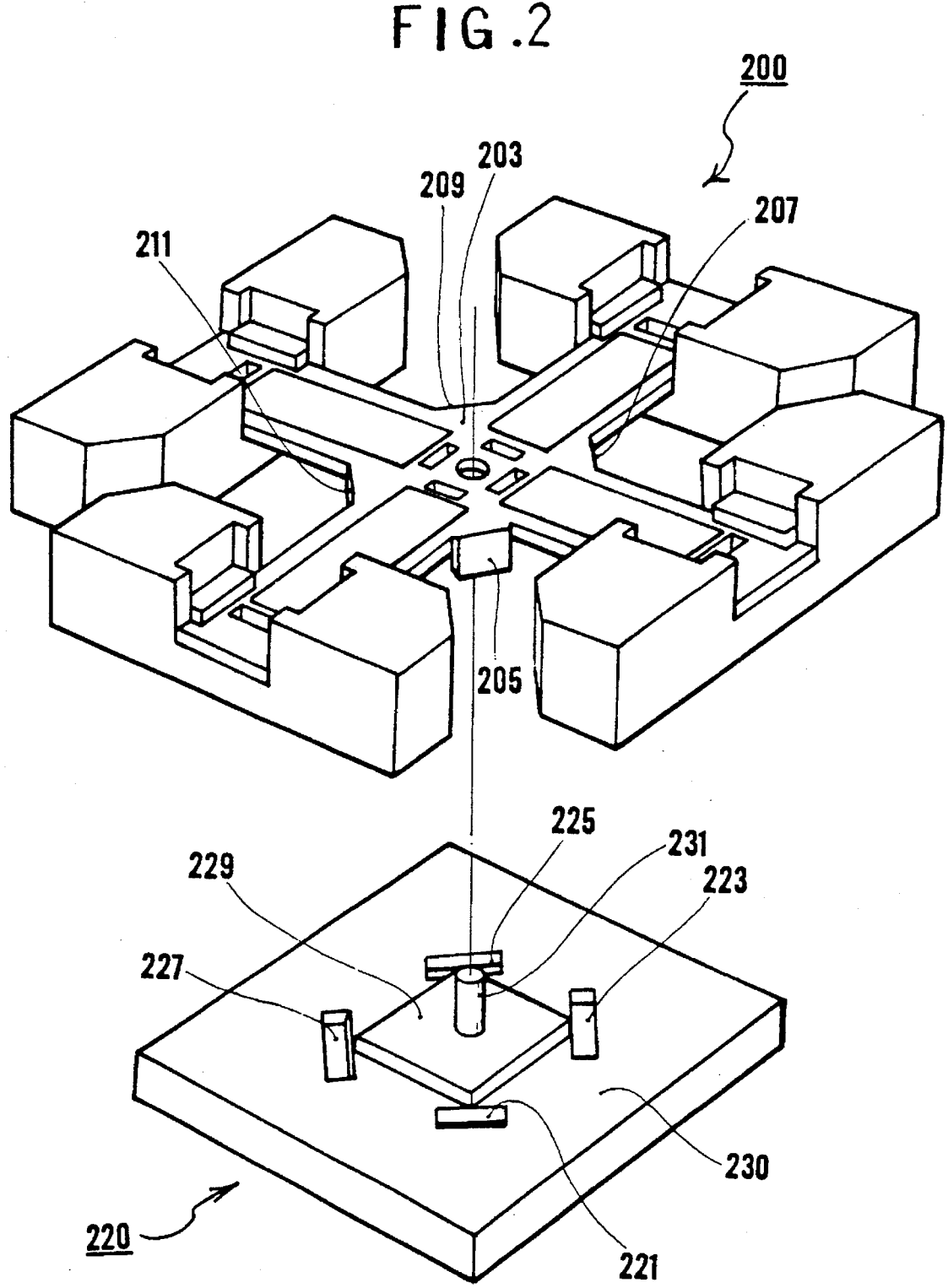
FIG. 2 is a perspective view of a two-directional angular acceleration sensor according to another preferred embodiment of this invention.

FIG. 2 is a perspective view showing a preferred embodiment of the angular acceleration sensor having a two direction characteristic according to the present invention.

A cross-shaped elastic plate 203 operates in response to the angular accelerations of two axes and the two axes are perpendicular each other so that the rotation angular accelerations applied to each axis may not influence each other. Position guides 205, 207, 209, 211 are formed in the four corners in which two plate arms intersect each other. The cross-shaped elastic plate 203 is fixed to the supporting frame 220 by inserting these position guides to guide grooves 221, 223, 225, 227. A supporting step 229 is projected in a predetermined height from a supporting plate 230, so that the cross-shaped elastic plate 203 may not contact the supporting plate 230 when the arms of the cross-shaped elastic plate 203 vibrate.

Since the other structures except above described are similar to the angular acceleration sensor shown in FIG. 1, more detailed description will be abbreviated.

In another embodiment of the present invention, a strain gage can be used in place of the piezoelectric element. The strain gage can be formed of a conductive material. In case that the strain gage changes lengthwise, its resistance is proportional to the length and inversely proportional to the sectional area.

In case that the strain gages are attached onto the upper side of the elastic plate 106 as shown in FIGS. 3(A)–3(C), when the rotation force is applied in direction of "b", the left side strain gage 119 receives tensile forces, which results in the increase of its length and the decrease of its cross sectional area, thereby its resistance increases.

On the other hand, the right strain gage 121 receives compressing forces, which results in the decrease of length and the increase of cross sectional area, thereby its resistance decreases.

When the rotation force is applied in direction of "a", the left side strain gage 119 receives compressing forces, which results in the increase of its cross sectional area and the decrease of its length, thereby its resistance decreases.

On the other hand, the right strain gage 121 receives tensile forces, which results in the increase of length and the decrease of cross sectional area, thereby its resistance increases.

Figure 5:
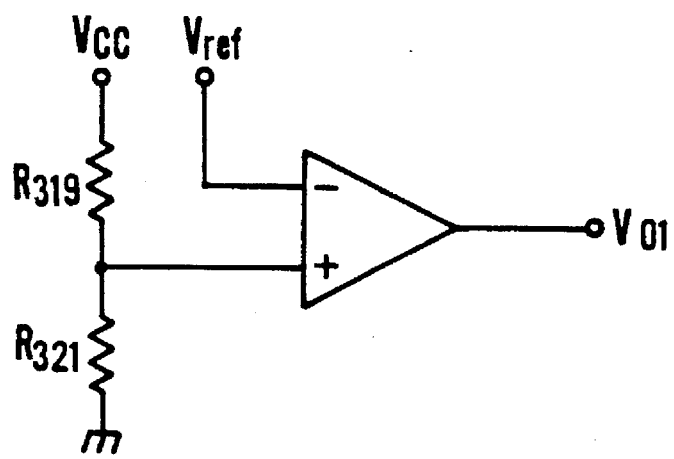
FIG. 5 illustrates a circuit of the one-directional angular acceleration sensor according to the present invention.

Thus, if each strain gage is connected to the circuit as shown in FIG. 5 by electrical connecting means such as a wire, the direction and strength of the applied rotation force can be detected by processing signal according to the voltage change applied to each strain gage. Because the strain gages 119, 121 should be insulated with the elastic plate 106, the strain gages 119, 121 are attached to the elastic plate 106 using a nonconducting adhesive.

Figure 4A:
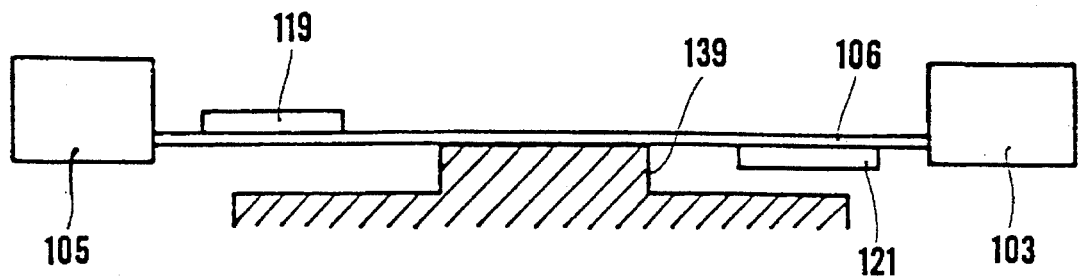
FIGS. 4(A), (B) and (C) are schematic diagrams showing the operation of the two-directional angular acceleration sensor according to another embodiment of the present invention.
Figure 4B:
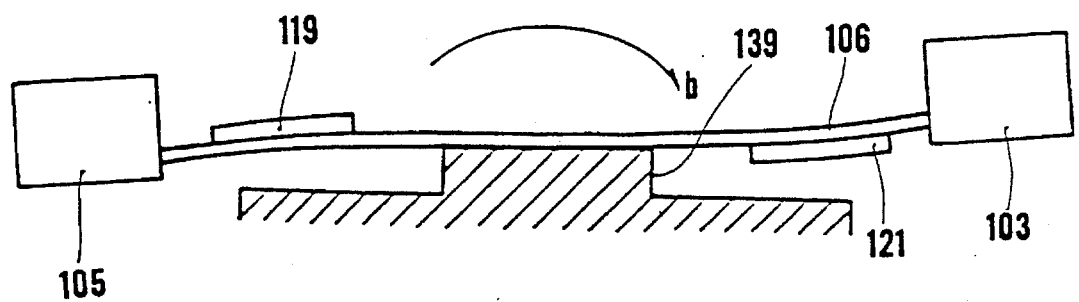
Figure 4C:
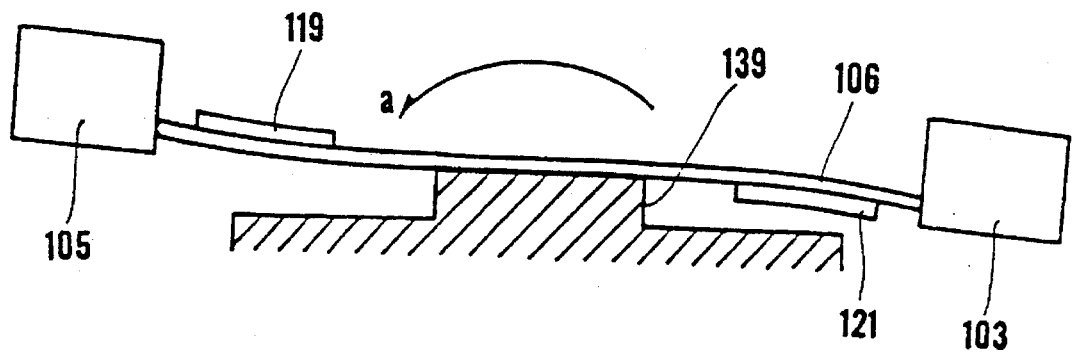
Figure 6:
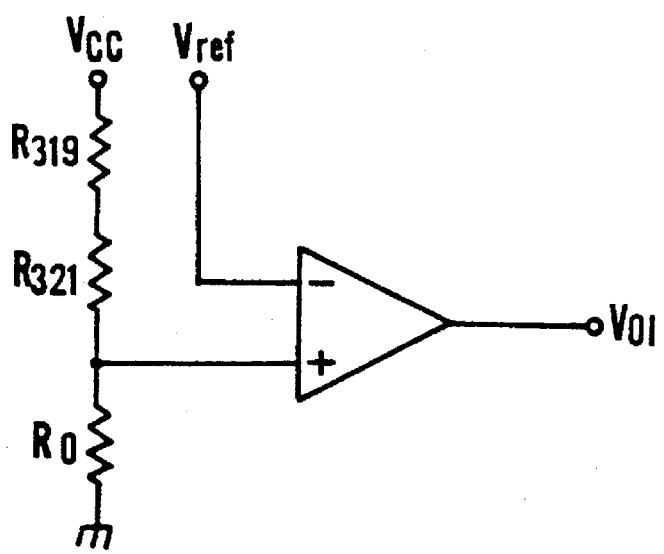
FIG. 6 illustrates another circuit of the one-directional angular acceleration sensor according to the present invention.
Figure 7:
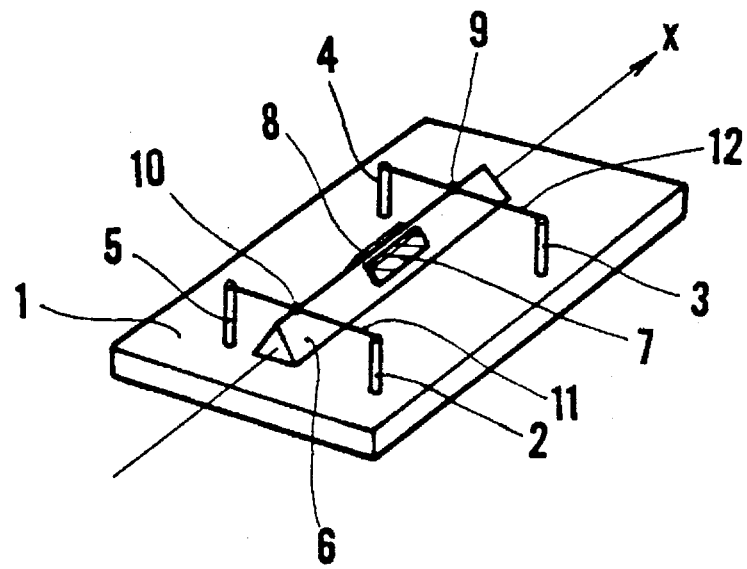
FIG. 7 is a structural diagram showing the structure of the angular acceleration sensor according to the prior art.
Figure 8:
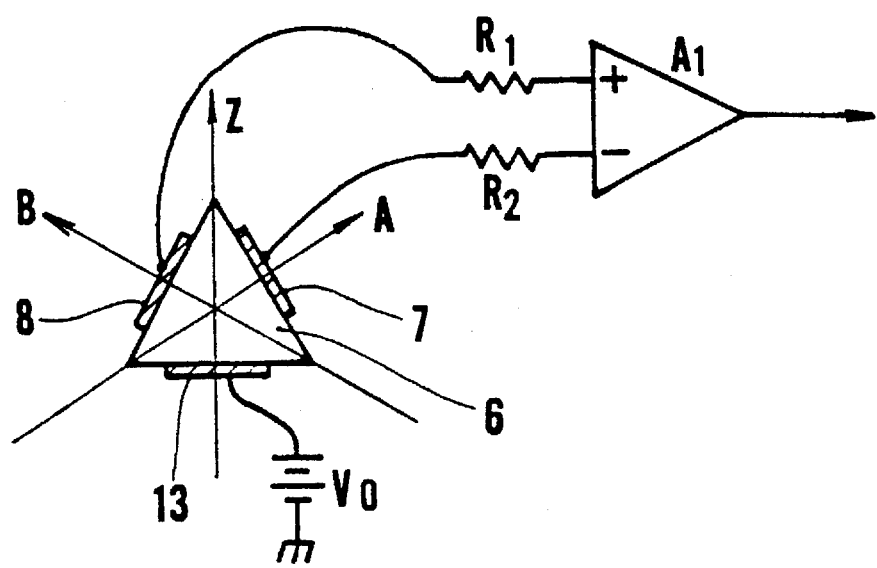
FIG. 8 is a schematic diagram for describing the operation of the angular acceleration sensor according to the prior art.

The strain gages 119, 121 can be attached onto the elastic plate as shown in FIGS. 4(A)–4(C), i.e. one onto the top and another onto the bottoms surface of the elastic plate 106. When the rotation force is applied in direction of "b" as shown in FIG. 4(B), both of the left strain gage 119 and the right strain gage 121 receive tensile force, thereby their resistances are increased. When the rotation force is applied in direction of "a" as shown in FIG. 4(C) both of the right and left strain gages receive suppressing force, thereby their resistances are decreased. In this case, as shown in FIG. 6, the processing circuit is made so that it may detect the voltage change between total resistances of the strain gages 119, 121 and reference resistor (Ro).

Heretofore, the single-axis angular acceleration sensor having a strain gage has been described. The two-axis angular acceleration sensor can be described in the same manner. The two-axis angular acceleration sensor of the present invention has the structure arranged so that the two single-axis angular acceleration sensors perpendicularly intersect each other in the center and are on the same plane.

As described above, the angular acceleration sensor according to the invention is not influenced by Coriolis force and excellent in fabrication. Also mutual disturbance generated in the case of using two sensors is removed by detecting the angular acceleration of two axis with one sensor.

What is claimed is:

1. A sensor for sensing an angular acceleration, comprising:

an elastic plate having a pair of symmetrical and opposite arms arranged outward from a center of the plate, said arms bending in opposite directions in response to a rotation force acting about an axis lying within a plane formed by the arms;

a pair of piezoelectric elements adhered onto the elastic plate, each element being symmetrically positioned at the same distance from the center of the plate, the piezoelectric elements generating an electrical signal in response to tensile or compressing forces formed by the bending of the elastic plate;

a pair of inertia bodies, each body being symmetrically positioned at an end of each arm; and a member for supporting the center of the elastic plate, wherein said elastic plate has position-indicating grooves to which the piezoelectric elements are attached.

2. A sensor for sensing an angular acceleration, comprising:

an elastic plate having a pair of symmetrical and opposite arms arranged outward from a center of the plate, said arms bending in opposite directions in response to a rotation force acting about an axis lying within a plane formed by the arms;

a pair of piezoelectric elements adhered onto the elastic plate, each element being symmetrically positioned at the same distance from the center of the plate, the piezoelectric elements generating an electrical signal in response to tensile or compressing forces formed by the bending of the elastic plate;

a pair of inertia bodies, each body being symmetrically positioned at an end of each arm; and a member for supporting the center of the elastic plate, wherein said elastic plate is fixed to the inertia bodies by compressing the arms of the elastic plate with cut segments of lateral faces of the inertia bodies.

3. A sensor for sensing an angular acceleration, comprising:

an elastic plate having four symmetrical and opposite arms, each arm being perpendicular to the adjacent arms and positioned at the same distance from a center of the plate, each arm bending towards opposite directions to the bending direction of the opposite arm by a rotation force acting about an axis lying within the plane formed by the four arms;

piezoelectric elements adhered onto the arms and each element being symmetrically positioned at the same distance from the center of the elastic plate, the piezoelectric elements generating an electrical signal in response to tensile or compressing forces formed by the bending of the elastic plate;

inertia bodies positioned at each end of the arms of the elastic plate; and means for supporting the centroid of the elastic plate, wherein position guides are formed in the four corners where the arms of the elastic plate intersect.

4. A sensor for sensing an angular acceleration comprising:

an elastic plate having four symmetrical and opposite arms, each arm being perpendicular to the adjacent arms and positioned at the same distance from a center of the plate, each arm bending towards opposite directions to the bending direction of the opposite arm by a rotation force acting about an axis lying within the plane formed by the four arms;

piezoelectric elements adhered onto the arms and each element being symmetrically positioned at the same distance from the center of the elastic plate, the piezoelectric elements generating an electrical signal in response to tensile or compressing forces formed by the bending of the elastic plate;

inertia bodies positioned at each end of the arms of the elastic plate; and means for supporting the centroid of the elastic plate, wherein the support means include guide grooves for fixing the elastic plate.

* * * * *